July 28, 1942.                D. M. WATTS                2,291,012
                                BRAKE
                          Filed Sept. 28, 1940

INVENTOR
DANIEL M. WATTS
BY
ATTORNEY

Patented July 28, 1942

2,291,012

UNITED STATES PATENT OFFICE 2,291,012

BRAKE

Daniel M. Watts, South Bend, Ind., assignor to Bendix Aviation Corporation, South Bend, Ind., a corporation of Delaware Application September 28, 1940, Serial No. 358,822

7 Claims. (Cl. 188—78)

This invention relates to brakes and is illustrated as embodied in a brake having a pair of individually shiftable shoes.

It is an object of my invention to provide an effective brake which will at the same time be inexpensive to manufacture and have as few component parts as possible. To this end the backing plate is utilized to provide anchoring means for the shoes and a novel adjustment housing is welded to the backing plate, so that the adjustment means may also serve as anchoring means.

It is also an object of my invention to provide a brake having a pair of individually floating shoes which are spread by balanced thrust means at either end thereof and which anchor against the backing plate on one side and against an adjustment housing which is anchored to the backing plate on the other side.

Figure 1:
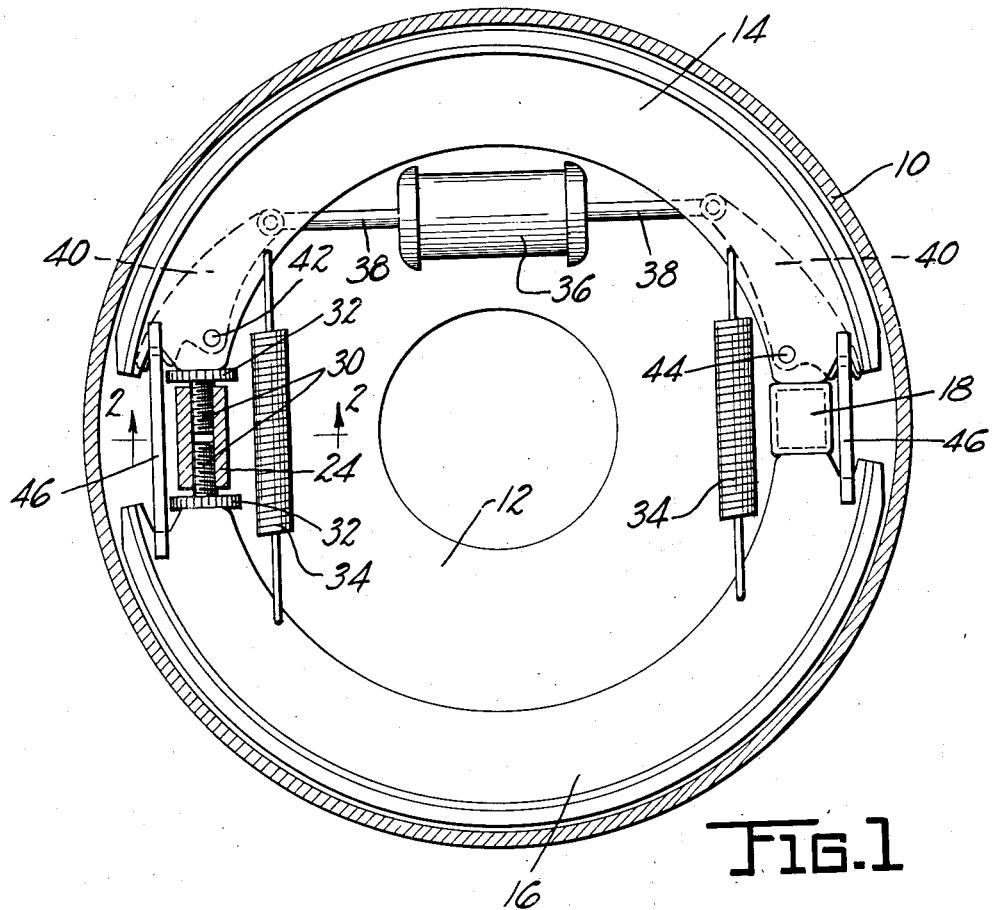
Figure 2:
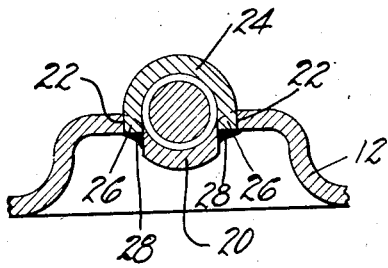

Other objects and features of my invention will be apparent during the course of the following description, reference being had therein to the accompanying drawing, in which:

Figure 1 is a vertical section taken through the brake on a plane just inside the head of the brake drum, showing the shoes in side elevation; and Figure 2 is a section taken on the line 2—2 of Figure 1.

Referring now specifically to the embodiment of my invention shown in the accompanying drawing, we find in Figure 1 a brake assembly comprising the customary rotatable and stationary portions. The rotatable portion consists in a brake drum 10. The stationary portion comprises a backing plate 12 and shoes 14 and 16 arranged to anchor thereon. The backing plate, made by stamping operation or the like, is formed with a rectangularly shaped projection 18 which serves as the anchor for one end of the brake shoes. Adjacent the opposite ends of the shoes the backing plate is grooved as shown at 20. Adjacent the groove and on both sides thereof are a series of openings 22 in the backing plate. An adjustment housing or half sleeve 24 which is U-shaped in cross section has a plurality of prongs 26 which are adapted to extend through the opening 22 in the backing plate. The ends of the prongs are squash-welded as shown at 28 to the backing plate, securing the housing 24 thereto. The interior surfaces of the housing and the backing plate thus form the sides of a substantially circular opening. The sides of the opening are internally threaded and are adapted to receive the externally threaded screw portions of adjusting screws 30, one of which is inserted in each end of the housing. The heads 32 of the adjusting screws serve as anchors for the adjacent ends of the brake shoes. Brake release springs 34 connect the brake shoes to return them to their normal position after an application of the brakes has been made and the applying pressure is released.

I have illustrated the brake shoes as riding in the substantially horizontal position, i. e., a line drawn from one end of either brake shoe to the other end thereof would be approximately horizontal. Adjacent the upper one of the two shoes and opposite the center thereof is provided a hydraulic brake applying cylinder 36 which is secured to the backing plate by any suitable means. Brake applying pistons in the cylinder 36 (not shown) are connected by rods 38 to a pair of bellcrank levers 40 which are pivoted at 42 and 44 to opposite ends of the brake shoe 14. Links 46 connect the outer ends of the levers 40 to the ends of the shoe 16.

The manner of application of my improved brake is as follows. When fluid under pressure is admitted to the hydraulic cylinder 36 the pistons therein are urged apart moving the rods 38 to turn the levers 40 about their respective pivot points on shoe 14. The lever pivoted at 42 turns in a counterclockwise direction about the point 42 to thrust the associated link 46 and move the left end of the shoe 16 against the brake drum. Resistance to such movement of the end of shoe 16 causes the lever to pivot at the upper end of the link 46 and to exert a force through its pivot point 42 moving the left end of the shoe 14 upward against the brake drum. Likewise the lever which is pivoted at 44 tends to move in a clockwise direction spreading the right ends of the shoes 14 and 16 by means of its associated link 46 and its pivotal connection at 44 with the shoe 14. If the drum is rotating in a forward direction as indicated by the arrow, the wrapping action of the drum when the shoes are moved against it will cause the shoe 14 to anchor against the adjustment member while the shoe 16 anchors on the backing plate projection 18. If the brake drum is rotating in the other direction when the brakes are applied the shoe 14 will anchor on the backing plate projection 18 while the shoe 16 anchors on the adjustment member. As heretofore explained the shoes in anchoring on the adjustment member anchor against the heads of the respective adjusting screws. When the lining of the brake has been substantially worn, the adjusting screws 30 may be turned to assume a position which will move the brake shoes into the desired proximity to the brake drum. At the same time the hydraulic liquid in the hydraulic system associated with the wheel cylinder 36 will spread the pistons therein to take up the slack in the brake created by the adjustment.

While I have described a single specific embodiment of my invention, it is not my intention that the said invention be limited in scope to that embodiment or be limited otherwise than by the terms of the appended claims.

I claim:

1. A brake assembly comprising, in combination, a rotatable brake drum, a non-rotatable support member, an anchor associated with the said support member, a half sleeve welded to the support member opposite the said anchor, adjusting screws inserted between the half sleeve and the support member, and a pair of individually shiftable shoes each arranged to anchor either on one of the said screws or on the said anchor member depending upon the direction of rotation of the brake drum at the time the brake is applied.

2. A brake assembly comprising, in combination, a rotatable brake drum, a non-rotatable support member, an anchor associated with the said support member, a half sleeve welded to the support member opposite the said anchor, adjusting screws inserted between the half sleeve and the support member, a pair of individually shiftable shoes each arranged to anchor either on one of the said screws or on the said anchor member depending upon the direction of rotation of the brake drum at the time the brake is applied, and applying means for moving the shoes into contact with the drum comprising a hydraulic wheel cylinder, a pair of bellcrank levers pivoted on one of the shoes, and a pair of thrust links connecting the levers to the other shoe.

3. A brake assembly comprising, in combination, a rotatable brake drum, a non-rotatable support member, an anchor associated with the said support member, a half sleeve welded to the support member opposite the said anchor, adjusting screws inserted between the half sleeve and the support member, a pair of individually shiftable shoes each arranged to anchor either on one of the said screws or on the said anchor member depending upon the direction of rotation of the brake drum at the time the brake is applied, and applying means for moving said shoes into contact with the drum comprising a hydraulic wheel cylinder disposed adjacent one of the shoes and near the center thereof, a pair of bellcrank levers pivoted on one of the shoes, and a pair of thrust links connecting the levers to the other shoe.

4. In a brake, the combination of a support member having a projection thereon and having a plurality of openings therein approximately opposite the said projection, with a half sleeve having prongs arranged to be inserted through said openings and welded to the support member, adjusting means adapted to be supported between said half sleeve and said support member, and a plurality of individually shiftable friction members arranged to anchor at times on the projection and at times on the adjusting member.

5. The combination of a brake backing plate having formed integrally therewith a raised portion centrally grooved, a housing secured thereto and forming with the groove a substantially cylindrical opening, and brake adjusting and anchoring means supported between the housing and the support member.

6. A brake assembly comprising a rotatable brake drum, a non-rotatable stamped backing plate having a raised portion centrally grooved, a half sleeve welded to the backing plate, an adjusting screw inserted between the half sleeve and the backing plate so as to partially extend into the groove, and a brake shoe for at times frictionally contacting the drum and arranged when contacting the drum to anchor on the adjusting screw in one direction of drum rotation.

7. In a brake having a rotatable brake drum, the combination of a support member having an integral anchor projection thereon, with an adjustment housing welded to the support member approximately opposite the said anchor projection, adjusting means adapted to be supported between the adjustment housing and the support member, and a friction element arranged to anchor on the adjusting means or on the anchor projection according to the direction of rotation of the brake drum at the time the brake is applied.

DANIEL M. WATTS.